United States Patent [19]

Watanabe

[11] Patent Number: 4,940,871
[45] Date of Patent: Jul. 10, 1990

[54] METHOD OF RESTORING A WIRE ELECTRODE BROKEN DURING AN ELECTRIC DISCHARGE MACHINING OPERATION

[75] Inventor: Naoki Watanabe, Aichi, Japan

[73] Assignee: Mitsubishi Denki Kabushiki Kaisha, Tokyo, Japan

[21] Appl. No.: 317,705

[22] Filed: Mar. 1, 1989

[30] Foreign Application Priority Data

Mar. 1, 1988 [JP] Japan ................................. 53-48117

[51] Int. Cl.[5] .............................................. B23H 7/06
[52] U.S. Cl. .................................................. 219/69.12
[58] Field of Search .............. 219/69.12, 69.17, 69.16; 204/206

[56] References Cited

U.S. PATENT DOCUMENTS

| | | | |
|---|---|---|---|
| 3,891,819 | 6/1975 | Ullmann et al. | 219/69.12 |
| 4,506,129 | 3/1985 | Katsube et al. | 219/69.12 |
| 4,544,819 | 10/1985 | Nomura et al. | 219/69.12 |
| 4,547,647 | 10/1985 | Schneider | 219/69.12 |
| 4,652,716 | 3/1987 | Schneider et al. | 219/69.12 |

FOREIGN PATENT DOCUMENTS

| | | | |
|---|---|---|---|
| 56-76343 | 6/1981 | Japan . | |
| 61-14820 | 1/1986 | Japan | 219/69.17 |
| 293724 | 12/1986 | Japan | 219/69.17 |
| 124824 | 6/1987 | Japan | 219/69.17 |

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A method of restoring a wire electrode which has been broken during an electric discharge machining operation. A new wire electrode, which replaces the broken wire electrode, moves from an initial machining point to an electrode breaking point with the application of a voltage between a workpiece and the wire electrode to generate an electric discharge therebetween resulting in smooth movement of the electrode.

7 Claims, 2 Drawing Sheets

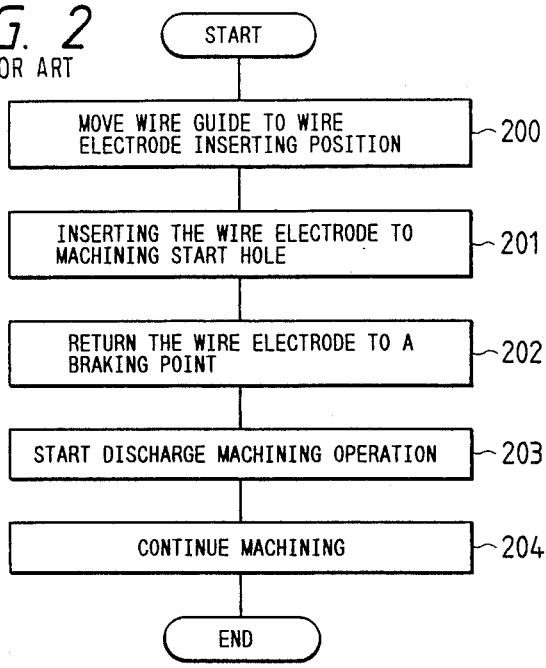
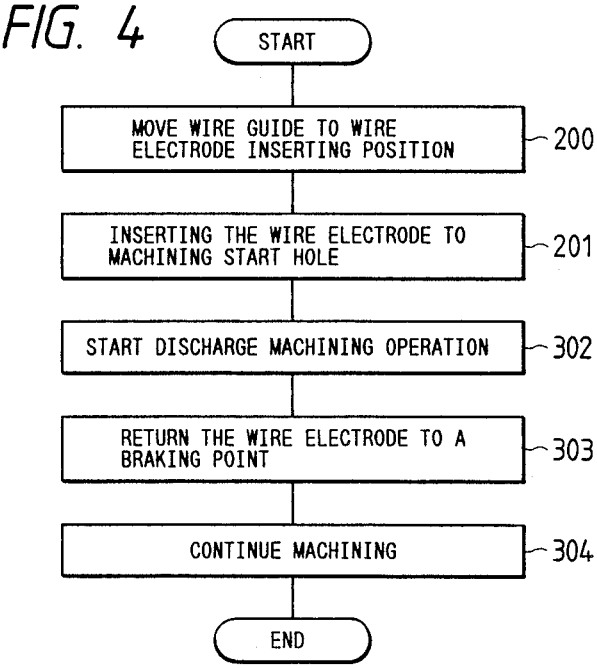

METHOD OF RESTORING A WIRE ELECTRODE BROKEN DURING AN ELECTRIC DISCHARGE MACHINING OPERATION

BACKGROUND OF THE INVENTION

This invention relates to a wire cut electric discharge machining, and more particularly to a method of restoring a wire electrode broken during an electric discharge machining operation.

FIG. 1 is an explanatory diagram showing the arrangement of an ordinary wire cut electric discharge machining apparatus. In FIG. 1, reference numeral 1 designates an NC (numerical control) tape; 2, a numerical control device; 3, a workpiece to be machined; 4, a wire electrode; 5, a machining power source for applying a machining voltage between the workpiece 3 and the wire electrode 4; 6, a bobbin around which the wire electrode has been wound, or a wire electrode supplying bobbin; 7, a machining starting hole which has been formed in the workpiece 3 in advance; 8, an upper voltage applying element provided above the workpiece 3, for applying the machining voltage of the machining power source 5 to the wire electrode 4; 9, lower voltage applying element provided below the workpiece 3, for applying the machining voltage of the machining power source 5; 10, an upper guide roller provided above the workpiece 3, for changing the direction of running the wire electrode 4; and 11, a lower guide roller provided below the workpiece 3, for changing the direction of running the wire electrode 4.

Further in FIG. 1, reference numeral 12 designates an X-table for moving the workpiece 3 placed thereon along the X-axis; 13, a Y-table for moving the workpiece 3 placed thereon along the Y-axis, the X-table 12 and the Y-table 13 constituting a cross table 14; 15, an X-axis motor for moving the X-table 12 along the X-axis in response to output instructions of the numerical control device 2; 16, a Y-axis motor for moving the Y-table along the Y-axis in response to output instructions of the numerical control device 2; and 17, a pipe guide movable vertically (or along the Z-axis) with respect to the workpiece 3, into which the wire electrode 4 is inserted so as to be inserted into the machining starting hole 7; 18, an upper guide provided at the end of the pipe guide 17, for guiding the wire electrode 4 to a machining point; 19, a cutter for cutting a tip end of the wire electrode 4 sharp before the wire electrode 4 is inserted into the machining starting hole 7; 19a, an automatic wire electrode supplying device comprising the pipe guide 17, the upper guide 18 and the cutter 19, the device 19a automatically cutting and shaping the wire electrode 4 and then extending it along the wire electrode setting path in response to an instruction from the numerical control device 2 before the start of an electro-discharge machining operation; 20, a lower guide disposed below the workpiece 3; 21, a take-up bobbin around which the wire electrode used is wound; and 22, a groove machined in the workpiece 3 according to an instruction provided by the numerical control device 2.

Still further in FIG. 1, reference numeral 23 designates a machining solution supplied to the groove 22 which is being machined in the workpiece 3; 24, a first machining-solution tank in which the machining solution to be used is contained; 25, a pump for pumping the machining solution out of the tank 24 to supply to the machined groove 22; 26, a second machining-solution tank in which the machining solution used is contained after being circulated; 27, a machining solution purifying device made of ion exchange resin which filters the machining solution in the second machining solution tank and returns into the first machining solution tank 24 so as to be used again; and 28, a machining solution supplying device including the machining solution 23, the first machining solution tank 25, the second machining solution tank 25, and the machining solution purifying device 27.

The operation of the ordinary wire cut electric discharge machining apparatus thus organized as shown in FIG. 1 will be described.

The wire electrode 4 from the bobbin 6 is supplied through the upper guide roller 10 into the automatic wire electrode supplying device 19a. The end portion of the wire electrode 4 thus supplied, after being passed through the pipe guide 17 and the upper guide 18, is cut sharp with the cutter 19. Thereafter, the automatic wire electrode supplying device 19a is moved downwardly, so that the wire electrode 4 thus cut is inserted into the machining starting hole 7 (which has been formed in the workpiece 3 in advance) with the aid of the pipe guide 17, and is then inserted into the lower guide 20. Thereafter, the wire electrode, passing through the lower guide roller 11, is wound on the take-up bobbin 21. Thus, the automatic wire electrode supplying operation has been accomplished.

On the other hand, in response to the output instructions of the numerical control device 2 receiving numerical data from the NC tape, the X-axis motor 15 and the Y-axis motor 16 drive the X-table 12 and the Y-table 13, respectively; that is, the cross table 14 bearing the workpiece 3 is moved two-dimensionally in the orthogonal coordinate system including the X-axis and the Y-axis. In association with this operation, the machining power source 5 applies the machining voltage, or high frequency pulse voltage, across the wire electrode 4 and the workpiece 3 through the upper voltage applying element 8 and the lower voltage applying element 9, while the machining solution 23 is pumped out of the first machining solution tank 24 in the machining solution supplying device 28 and supplied to the machined groove 22. As a result, electric discharge occurs between the workpiece 3 and the wire electrode 4 through the machining solution 23 to machine the workpiece along the contour (or locus) which is specified by the NC tape. The machining solution used in the machined groove 22 is returned through a predetermined circulating path (not shown) into the second machining solution tank 26. The machining solution thus returned is filtered and returned into the first machining solution tank 24, as described above, so as to be used again.

When the wire electrode 4 is broken for some reason during the electric discharge machining operation, the electric discharge machining apparatus operates as follows:

As shown in FIG. 3, the discharge machining operation of the workpiece 3 is started at the machining starting hole 7, or a machining starting point 100, and advances along a first machining path 101, a second machining path 102, a third machining path 103, a fourth machining path 104, and so on. It is assumed that the wire electrode 4 is broken at a point 120 on the fourth machining line 104 (hereinafter referred to as "a wire electrode breaking point 120", when applicable), and accordingly the application of the machining voltage is suspended. At the same time, as indicated in step 200 in FIG. 4, the numerical control device 2 outputs an instruction of moving the wire guide 17 to the wire electrode inserting position; that is, the machining starting point 100. In response to the instruction, the cross table 14 is moved so that the wire guide 17 is moved from the wire electrode breaking point 120 through a path 110 to the machining starting point 100. Upon completion of the movement of the wire guide 17, the numerical control device 2 outputs an instruction of inserting the wire into the machining starting hole, as indicated in step 201 in FIG. 4. In response to the instruction, the automatic wire electrode supplying operation is started. First, the tip end portion of the wire electrode 4 is cut sharp with the cutter 19. Then, the automatic wire electrode supplying device 19a is moved downwardly, so that the wire electrode 4 thus cut is inserted into the machining starting hole 7 of the workpiece 3 with the aid of the pipe guide 17, and is then inserted into the lower guide 20. The wire electrode 4 thus inserted is wound around the take-up bobbin 21 through the lower guide roller 11. Thus, the automatic wire electrode supplying operation has been accomplished.

Under this condition, as indicated in step 202 in FIG. 2, the numerical control device 2 provides an instruction of returning the wire electrode to the wire electrode breaking point. In response to the instruction, while the machining voltage is not applied, the cross table 14 is moved so that the wire electrode 4 is moved along the machining paths 101, 102, 103 and 104 to the wire electrode breaking point 120. Upon arrival of the wire electrode to the wire electrode breaking point 120, as indicated in step 203 in FIG. 2, the machining power source 5 is operated again to apply the machining voltage across the workpiece 3 and the wire electrode 4. Thus, the workpiece 3 is machined along the contour; i.e., the machining paths 104, 106 and 107.

If, thereafter, the breaking of the wire electrode occurs again, the same operation is carried out to continue the discharging machining operation.

In the ordinary electric discharge machining apparatus, the above-described method is employed to restore the wire electrode when broken during the discharge machining operation. Therefore, when the wire electrode 4 is returned to the wire electrode breaking point through the machined groove 22 from the machining starting point 100, the wire electrode may be broken by residual material such as rust or sludge in the machined groove 22 or by the machining distortion of the workpiece 3.

SUMMARY OF THE INVENTION

Accordingly, an object of the present invention is to eliminate the above-described difficulties accompanying an ordinary electric discharge machining apparatus. More specifically, an object of the invention is to provide a method of restoring a wire electrode broken during an electric discharge machining operation in which, even when there is a residual material such as rust or sludge in the machined groove of a workpiece, the wire electrode can be returned from the machining starting point to the wire electrode breaking point through the machined groove without being interfered with and broken.

The above, and other objects of the present invention is accomplished by a method of restoring a wire electrode broken during an electric discharge machining operation in which a workpiece and said wire electrode are moved relative to each other with a machining voltage applied therebetween to machine said workpiece along a predetermined contour, comprising the steps of detecting that said wire electrode is broken during the electric discharge machining operation;

moving said workpiece to an initial machining point to restore said wire electrode which has been broken;

setting a new wire electrode to carry out further machining operation; and moving said workpiece to return said new wire electrode through a groove formed along said contour in said workpiece to a wire breaking point where said wire electrode has been broken and the electric discharge machining operation is carried out again, while an electric discharge is caused between said wire electrode and said workpiece with a machining voltage applied therebetween.

BRIEF DESCRIPTION OF THE DRAWINGS

In the accompanying drawings.

FIG. 2 is a flow chart for a description of the ordinary method of restoring a wire electrode broken during a wire cut electric discharge machine;

FIG. 4 is a flow chart for a description of a method of restoring a wire electrode broken according to the present invention breaking point for a wire cut electric discharge machine according to this invention.

DESCRIPTION OF PREFERRED EMBODIMENT

Figure 1:
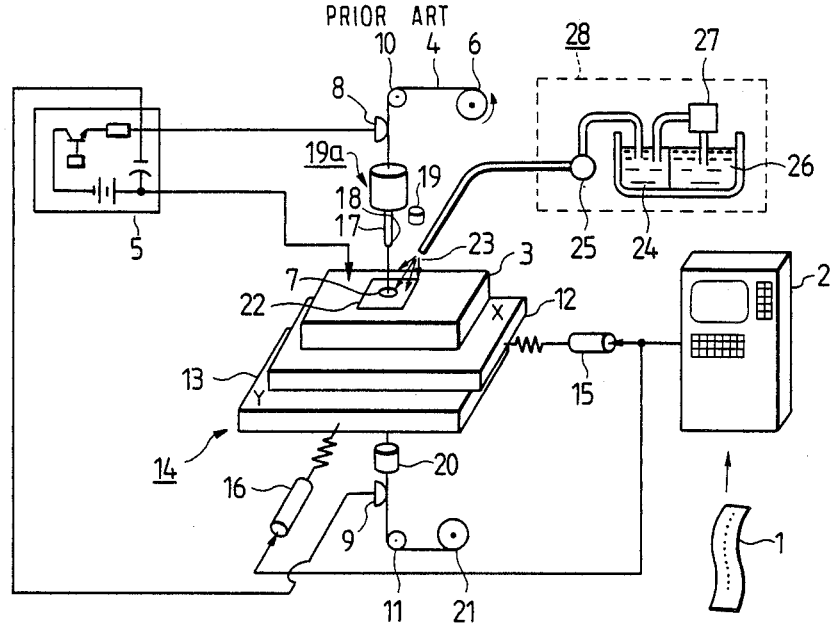
FIG. 1 is an explanatory diagram showing the arrangement of an ordinary wire cut electric discharge machine.

An embodiment of the present invention will be described with reference to the accompanying drawings. In the embodiment, the wire cut electric discharge machining apparatus is the same in arrangement as that shown in FIG. 1, and the machining contour is also the same as that shown in FIG. 3. FIG. 4 is a flow chart for a description of a method of restoring a wire electrode broken during a discharge machining operation.

The operation of the wire cut electric discharge machine according to the invention will be described. The electric discharge machining apparatus operates in the same manner as the above-described ordinary one with the exception of an operation of returning the wire electrode 4 to the wire electrode breaking point when broken (hereinafter referred to as "a wire electrode returning operation", when applicable). Therefore, mainly the wire electrode returning operation will be described herein under.

Figure 3:
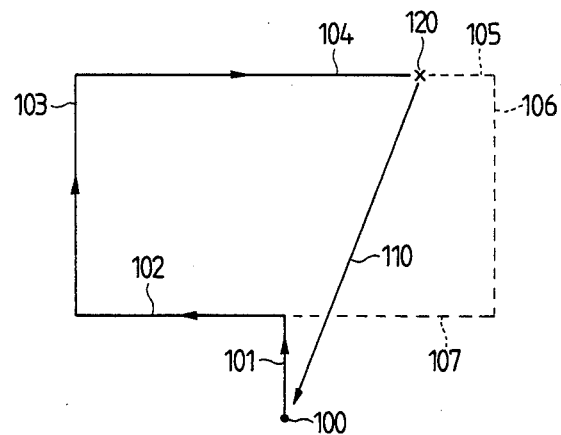
FIG. 3 is an explanatory diagram showing a machining contour along which a workpiece is machined.

Similarly as in the case of the ordinary electric discharge machining apparatus, when the wire electrode 4 is broken at the wire electrode breaking point 120 as shown in FIG. 3 and the application of the output of the machining power source 5 is then suspended, an instruction of moving the wire guide 17 to the wire inserting position as indicated in step 200 of FIG. 4 is issued by the NC device 2. In response to the instruction, the cross table 14 is moved so that the wire guide 120 is moved through the path 110 to the wire inserting position; i.e., the machining starting position 100. Upon completion of the movement of the cross table 14, similarly as in the ordinary machining apparatus, the numerical control device 2 provides a wire electrode inserting instruction as indicated in step 201 in FIG. 4, so that the automatic wire electrode supplying operation is started. First, the tip end of the wire electrode 4 broken is cut sharp with the cutter 19. Then, the automatic wire electrode supplying device 19a is moved downwardly. As a result, the wire electrode 4 thus cut is inserted into the machining starting hole 7 with the aid of the pipe guide 17 and then into the lower guide 20. The wire electrode 4 thus inserted is wound through the lower guide roller 11 around the take-up bobbin 21. Thus, the automatic wire electrode supplying operation has been accomplished.

Thereafter, the numerical control device 2 outputs an instruction of starting a discharge machining operation under the same conditions as those provided before the breakage of the wire electrode as indicated in step 302 in FIG. 4. In response to the instruction, the application of the output of the machining power source 5 is started again; that is, the machining voltage is applied across the wire electrode 4 and the workpiece 3. In succession to the instruction, the numerical control device 2 outputs an instruction of returning the wire electrode to the wire electrode breaking point as indicated in step 303 in FIG. 4. As a result, the cross table 14 is moved so that wire electrode 4 is moved along the machining paths 101, 102, 103 and 104 while performing the discharge machining operation. After the wire electrode 4 passes through the wire electrode breaking point 120, the numerical control device 2 outputs an instruction of continuing further discharging machining operation. Therefore, the wire electrode is moved along machining paths 105, 106 and 107, thus accomplishing the machining along the predetermined machining contour.

As was described above, if the wire electrode 4 is broken during the further discharge machining operation, the wire electrode is returned to the wire electrode breaking point while the machining voltage is being applied across the wire electrode 4 and the workpiece 3; that is, the discharge machining operation is being carried out. Therefore, even if residual rust or sludge remains in the machined groove 22 along which the wire electrode is returned to the wire electrode breaking point, it is removed by the force of explosion produced by electric discharge, so that the wire electrode is smoothly moved on. Thus, the frequency of breakage of the wire electrode is greatly reduced.

In the above-described embodiment, when the wire electrode is returned to the wire electrode breaking point, the machining conditions are made the same as the original ones provided when the discharge machining operation has been started; however, it should be noted that the invention is not limited thereto or thereby. That is, while the wire electrode is being returned to the wire electrode breaking point, other machining conditions (electrical machining conditions) may be employed. In this case, it goes without saying that, when the wire electrode reaches the wire electrode breaking point, the machining condition is changed to the original machining conditions. The following table shows an example of a machining condition for an actual machining operation and another machining condition for a returning operation of the new wire electrode. Another machining condition is determined so as to have an electrical machining energy lower than that obtained according to the actual machining condition.

|  | MACHINING VOLT. (V) | MACHINING CURRENT (I) | PAUSE PEROID ($\mu$S) | AVERAGE MACHINING V |
| --- | --- | --- | --- | --- |
| ACTUAL | 90 V | 550 A | 9 $\mu$S | 38–44 V |
| RETURN | 90 V | 250 A | 14 $\mu$S | 50–55 V |

As is apparent from the above table, a peak value of the machining current during the returning operation is set lower than that during the actual machining operation and the pause period of time during which no machining voltage is applied between the wire electrode and the workpiece is prolonged, to thereby increase the average of machining voltage. This results in a reduction in the amount of machining per unit period of time, that is, machining efficiency. It should be noted that the above example is for a high speed machining operation, and thus the machining condition for returning may be of the maximum.

Furthermore, in the above-described embodiment, the wire electrode is set on the machining path with the automatic wire electrode supplying device 19a; however, the same effect can be obtained by manually setting the wire electrode.

As was described above, in the method of the invention, when the wire electrode is broken during a discharge machining operation, it is returned from the machining starting point to the wire electrode breaking point while the machining voltage is being applied across the wire electrode and the workpiece; i.e., the discharge machining operation is being carried out. Therefore, the wire electrode is prevented from breakage when returned to the wire electrode breaking point.

What is claimed is:

1. A method of restoring a wire electrode broken during an electric discharge machining operation in which a workpiece and said wire electrode are moved relative to each other with a machining voltage applied therebetween to machine said workpiece along a predetermined contour, comprising the steps of:
   detecting that said wire electrode is broken during the electric discharge machining operation;
   moving said workpiece to an initial machining point to restore said wire electrode broken;
   setting a new wire electrode to carry out further machining operation; and
   applying a machining voltage between said new wire electrode and said workpiece; moving said workpiece while electric discharges are caused between said new wire electrode and said workpiece from said initial machining point to said wire breaking point through a groove formed in said workpiece; continuing to machine the workpiece from said wire breaking point.

2. The method of claim 1 wherein the setting operation of the new wire electrode at the initial machining point is automatically carried out by a wire electrode automatic supply means.

3. The method of claim 2 wherein a tip end of said wire electrode is cut sharp upon setting of the new wire electrode.

4. The method of claim 1 wherein, said wire electrode is returned to the wire breaking point with the machining voltage equal to the actual machining voltage before the breaking of the wire electrode.

5. The method of claim 1 wherein said wire electrode is returned to the wire breaking point under a machining condition different from an actual machining condition before the breaking of the wire electrode.

6. The method of claim 5 wherein after said wire electrode reaches the wire breaking point, the electric discharge machining is carried out under the same machining condition as the actual machining condition before the breaking of the wire electrode.

7. The method of claim 5 wherein the machining condition comprises an electrical machining condition.

* * * * *